United States Patent [19]

Takizawa et al.

[11] Patent Number: 4,916,743

[45] Date of Patent: Apr. 10, 1990

[54] PATTERN MATCHING SYSTEM

[75] Inventors: Yumi Takizawa; Shinichi Sato; Atsushi Fukasawa; Takuro Sato; Hiromi Ando; Yukio Suzuki, all of Tokyo, Japan

[73] Assignee: Oki Electric Industry Co., Ltd., Tokyo, Japan

[21] Appl. No.: 186,577

[22] Filed: Apr. 27, 1988

[30] Foreign Application Priority Data

| Apr. 30, 1987 | [JP] | Japan | 62-104632 |
| May 1, 1987 | [JP] | Japan | 62-106420 |
| May 1, 1987 | [JP] | Japan | 62-106421 |
| May 6, 1987 | [JP] | Japan | 62-108815 |
| May 6, 1987 | [JP] | Japan | 62-108818 |

[51] Int. Cl.$^4$ .......................... G10L 7/06; G10L 9/18
[52] U.S. Cl. ...................................... 381/45; 381/50
[58] Field of Search ...................................... 381/42–48, 381/50; 364/513.5, 724.01, 724.16, 724.17, 725

[56] References Cited

U.S. PATENT DOCUMENTS

| 4,060,694 | 11/1977 | Suzuki et al. | 381/45 |
| 4,524,424 | 6/1985 | White | 364/724.16 |
| 4,601,054 | 7/1986 | Watari et al. | 381/42 |
| 4,691,293 | 9/1987 | Conboy | 364/724.16 |
| 4,703,447 | 10/1987 | Lake, Jr. | 364/724.16 |
| 4,707,858 | 11/1987 | Fette | 381/43 |
| 4,736,429 | 4/1988 | Niyada et al. | 381/43 |
| 4,751,739 | 6/1988 | Serikawa et al. | 364/725 |
| 4,783,802 | 11/1988 | Takebayashi | 381/43 |
| 4,783,806 | 11/1988 | Nakamura et al. | 381/43 |

FOREIGN PATENT DOCUMENTS 148460 8/1984 Japan .

OTHER PUBLICATIONS

"Dynamic Programming Algorithm Optimization for Spoken Word Recognition", Sakoe et al., IEEE Transactions on Acoustics, Speed, and Signal Processing, vol. ASSP-26, No. 1, Feb. 1978, pp. 43-49.
"Frequency Warping for Nonuniform Talker Normalization," H. Matsumoto et al, ICASSP 79, IEEE International Conference on Acoustics, Speech & Signal Processing, Apr. 1979, pp. 566-569.
"An Approach to Speaker Normalization for Automatic Speech Recognition," J. Jaschul, ICASSP 79, Apr. 1979, pp. 235-238.
"Automatic Prediction of Linear Frequency Warp for Speech Recognition," R. J. Golibersuch, ICASSP 79, Apr. 1979, pp. 769-772.
"Linear Prediction on a Warped Frequency Scale," H. W. Strube, Journal of Acoustical Society of America, vol. 68, No. 4, Oct. 1980, pp. 1071-1076.
"A Method of Spoken Word Recognition Using Nonlinear Spectral Matching," J. Miwa et al, System- (List continued on next page.)

Primary Examiner—Gary V. Harkcom
Assistant Examiner—David D. Knepper
Attorney, Agent, or Firm—Spencer & Frank

[57] ABSTRACT

A circuit for pattern matching on the frequency axis which inlcudes a first transformation section having an adaptive filter which is generally identical to an adaptive finite impulse response filter, but with its delay elements having been replaced by all-pass filters. The first transformation section performs frequency transformation on an input signal and is characterized by utilizing as tap coefficients for the adaptive filter, linear predictive analysis coefficients of the input speech signal. The first transformation section outputs linear predictive analysis coefficients of the frequency transformed input signal. A second transformation section is similar to the first transformation section but the tap coefficients of its adaptive filter are linear predictive analysis coefficients of a reference speech signal. A control section calculates a distance between the respective linear predictive analysis coefficients output from the first and second transformation sections, calculates controlling parameters of the filters of the all-pass filters of the transformation sections so as to minimize this distance, and generates a pattern matching residual output on the frequency axis.

8 Claims, 12 Drawing Sheets

OTHER PUBLICATIONS s–Computers–Controls, vol. 12, No. 1, Jan.–Feb. 1981, pp. 28–37.

"Speaker–Adaptation Methods Using Selective Linear Prediction," N. Higuchi et al, ICASSP 86, IEEE–IECEG–ASJ International Conference on Acoustics, Speech and Signal Processing, Tokyo, Apr. 7–11, 1986, vol. 4 of 4, pp. 2647–2650.

"A New Speaker–Independent Voice Recognition Scheme for Voice Dialling," Y. Takizawa et al, 37th IEEE Vehiclular Technology Conference, Tampa, Florida, Jun. 1–3, 1987, pp. 547,551.

PATTERN MATCHING SYSTEM

BACKGROUND OF THE INVENTION

This invention relates to a pattern matching system used in speech recognition equipment, and more particularly to two-axis pattern matching on the frequency and time axes using linear predictive coefficients or the like.

This invention also relates to a frequency transformation circuit, more particularly to a circuit for transforming the frequency structure of a signal which can be incorporated in the pattern matching system.

When speaker-independent speech recognition apparatus performs pattern matching, it must first normalize individual differences which are present on both the frequency axis and the time axis. An example of a prior-art system of pattern matching on these two axes is disclosed in the paper "Speaker-Independent Spoken Word Recognition Based on Time-Frequency-Intensity Warping of Spectra", Nakagawa et al, *The Transactions of the Inst. of Electronics and Communication Engineers of Japan*,'81/2 Vol. J64-D No. 2. This method performs dynamic-programming matching (DPM) on the frequency axis and time axis of discrete output values from bandpass filters.

A problem in the above pattern matching system is that since it uses features obtained from the output of a bank of bandpass filters, it has difficulty in handling the details of frequency patterns accurately. Another method uses the fast Fourier transform (FFT) instead of a filter bank, but this method has the problem of confusing voice pitch effects with vocal-tract effects, and can provide only inexact results. A difficulty associated with speech recognition is that speech signal contains rapid changes along frequency axis.

SUMMARY OF THE INVENTION

An object of the present invention is to solve these problems and provide a pattern matching system for speech recognition equipment that can perform pattern matching on two axes accurately by a simple process.

Another object of the invention is to provide a frequency transformation circuit with the capability to perform a variety of frequency structure transformations.

To solve the problems stated above, in speech recognition system that performs pattern matching using linear predictive analysis coefficients, the pattern matching system according to one aspect of this invention comprises (a) a memory means for storing the linear predictive analysis coefficients of an input pattern and a reference pattern, and providing output of the data at a time specified by a command signal, (b) a first pattern matching section comprising (b1) a first transformation means having an adaptive filter generally identical to an adaptive finite impulse response (FIR) filter with its delay elements having been replaced by all-pass filters, for performing frequency transformation on the input pattern data from the above memory means, (b2) a second transformation means having an adaptive filter generally identical to an adaptive FIR filter with its delay elements having been replaced by all-pass filters, for performing frequency transformation on the reference pattern data from the above memory means, and (b3) a control means for calculating a distance between the output data from the first transformation means and the second transformation means, controlling the parameters of filters of at least one of the first and second transformation means so as to minimize this distance, and generating a pattern matching residual output on the frequency axis based on the minimum distance, and (c) a second pattern matching section for performing pattern matching on the time axis by dynamic programming according to the residual from the control means and generating a residual output on the time and frequency axes, and for giving a command signal to the memory means.

In a pattern matching system described above, the memory means transfers to the first pattern matching section and the second pattern matching section linear predictive analysis coefficients (this term being defined as coefficients obtained through linear predictive analysis, in this specification) such as linear predictive coefficients of the input pattern data and reference pattern data at a time indicated by a command signal from the second pattern matching section. Frequency transformation is performed there through adaptive control of the delays (in the delay elements) of at least one of the first transformation means and second transformation means by the control means (for example, by a distance calculation section and a parameter decision section described later).

For example, if only the delays in the first transformation means are controlled, the control means calculates a distance between the output data of the first and second transformation means, controls the delays in the first transformation means so as to minimize that distance, and transfers the minimum-distance pattern matching residual on the frequency axis to the second pattern matching section. Based on the residual on the frequecy axis, the second pattern matching section executes pattern matching on the time axis by means of dynamic programming (DP) and generates final output of the residual from pattern matching on both the frequency axis and the time axis.

In this way it is possible to solve the problems of the prior art stated earlier by simultaneously performing pattern matching on the frequency axis using linear predictive analysis coefficients, for example, as features and performing pattern matching on the time axis by DP matching.

According to another aspect of the invention, there is provided a circuit for pattern matching on the frequency according to this invention comprises: (a) a first circuit having a first memory means for storing a first constant series corresponding to a frequency transformation parameter value, which performs frequency transformation by a multiply-add operation on linear linear predictive analysis coefficients of an input pattern and the first constant series, and calculates the resulting distance from the linear predictive analysis coefficients of a standard pattern on which frequency transformation has already been performed; (b) a second circuit having a second memory means for storing a second constant series corresponding to the above parameter value, which calculates changes in the frequency-transformed linear predictive analysis coefficients induced by this parameter by performing a multiply-add operation on the linear predictive analysis coefficients of the input pattern and the second constant series; and (c) a third circuit for updating the parameter above so as to minimize the distance based on the outputs of the first circuit and the second circuit, and generating as output a pattern matching residual on the frequency axis based on the minimum distance.

In a pattern matching circuit of the above structure the first circuit (for example, a frequency transformation and distance calculation circuit described later) performs a multiply-add operation on the linear predictive analysis coefficients of the input pattern and a first constant series obtained from the first memory means corresponding to a parameter value set by the third circuit, thereby calculates the frequency-transformed linear predictive analysis coefficients, and also calculates the distance between these coefficients and the linear predictive analysis coefficients of a reference pattern, which have already been frequency-transformed. At the same time, the second circuit performs a multiply-add operation on the linear predictive analysis coefficients of the input pattern and a second constant series obtained from the second memory means corresponding to the parameter value set by the third circuit, thereby calculating the variations in the linear predictive coefficients induced by frequency transformation according to this parameter. The third circuit (for example: a residual detection circuit, α updating circuit, decision circuit, and switch) updates the parameters of the first and second memory means on the basis of the distance output from the first circuit and the variations output from the second circuit, so as to minimize the distance. As a result, the first and second memory means provide first and second constant series corresponding to the updated parameter value. When the updated calculation results attain a minimum value, the residual based on the minimum distance is output as the residual on the frequency axis. In this way pattern matching on the frequency axis is performed by storing first and second constant series corresponding to the parameter values in the first and second memory means, calculating the frequency-transformed linear predictive analysis coefficients as features by a multiply-add operation performed with these series, calculating the distance and variations, and adaptively controlling the parameter. The circuit can therefore be small and simple in structure, but can perform pattern matching on the frequency axis accurately.

According to another aspect of the invention, there is provided a frequency transformation circuit characterized by having a plurality of all-pass filters with a designated transfer characteristic, means for multiplying the output signals from these all-pass filters by tap coefficients, and an adder for adding the signals obtained from these means.

With this structure, the parameters defining the transfer characteristics of the all-pass filters are selected according to a desired purpose, and the tap coefficients are set in accordance with desired sample values depending on the desired purpose. In consequence, a transformation is effected between the frequency structure of an input signal and the frequency structure of a time series obtained as an output signal from a unit impulse input.

The frequency transformation circuit of the above structure has the ability to perform a variety of frequency structure transformations.

According to another aspect of the invention, there is provided a frequency transformation circuit which comprises storage means for storing parameters defining the designated transfer characteristics of a plurality of all-pass circuits, a parameter determining the size of a frequency transformation to be performed on an input signal, and constant values of a unit impulse series; and multiply-add means for multiplying and adding these constant values with the input signal.

With the above structure, the constant values necessary for frequency transformation of the input signal are read from the storage means wherein they are stored. The multiply-add means performs a multiply-add operation on the input signal and corresponding constant values, as a result of which a frequency-transformed output signal is obtained.

The frequency transformation circuit of this configuration is simple in structure, and small-sized.

DETAILED DESCRIPTION OF THE EMBODIMENTS

Figure 1:
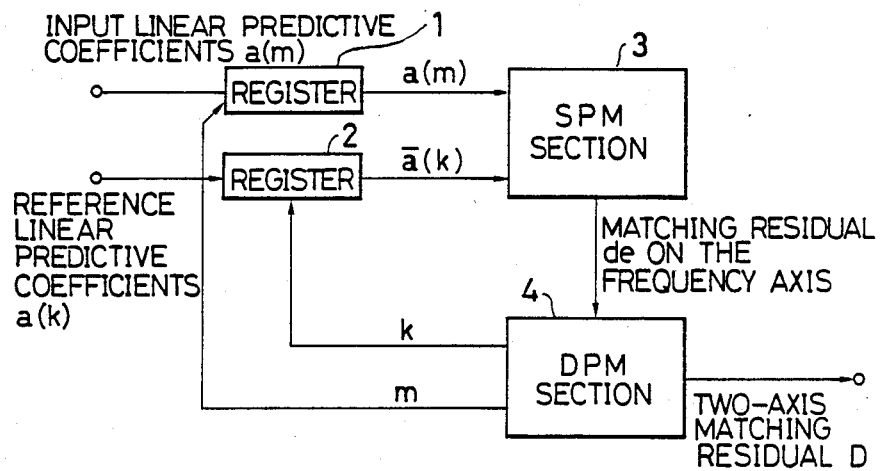
FIG. 1 is a block diagram showing a pattern matching system of an embodiment of this invention.

FIG. 1 is a block diagram showing an embodiment of this invention. In this figure the numeral 1 denotes a memory for storing linear predictive coefficients obtained as features from an input speech signal (input pattern), numeral 2 denotes a memory for temporarily storing linear predictive coefficients obtained as features from a reference speech signal (standard pattern), numeral 3 denotes a spectrum pattern matching (SPM) section that performs pattern matching on the frequency axis based on the signals output from the memories 1 and 2, and numeral 4 denotes a time pattern matching (DPM) section that performs pattern matching on the time axis, based on the output signals from the SPM section 3, by means of DP matching, and supplies the memories 1 and 2 with data m, k specifying time, so that the memories 1 and 2 produce the input data of the specific time.

The operation is explained next.

The memory 1 receives a set of linear predictive coefficients $a_{(m)} = \{a_0^{(m)}, a_1^{(m)}, \ldots, a_p^{(m)}\}$ (m=1, 2, ..., M; time) of the input speech signal on which pattern matching is to be performed, and sends to the SPM section 3 the linear predictive coefficients $\bar{a}_{(m)}$ for the time specified by the signal m from the DPM section 4. Similarly, the memory 2 receives a set of linear predictive coefficients $\bar{a}_{(k)} = \{\bar{a}_0^{(k)}, \ldots, \bar{a}_p^{(k)}\}$ (k=0, 1, ..., K; time) of the reference speech signal and sends to the SPM section 3 the linear predictive coefficients $\bar{a}_{(k)}$ for the time specified by the signal k from the DPM section 4. The SPM section 3 performs pattern matching on the frequency axis with regard to the linear predictive coefficients $\bar{a}_{(m)}$ of the input speech signal and the linear predictive coefficients $\bar{a}_{(k)}$ of the reference speech signal. The residual de that remains is sent to the DPM section 4. Based on the residual de from the SPM section 3, the DPM section 4 performs pattern matching on the time axis by DP matching, and generates final output of the residual D of pattern matching on both the frequency axis and the time axis.

Figure 2:
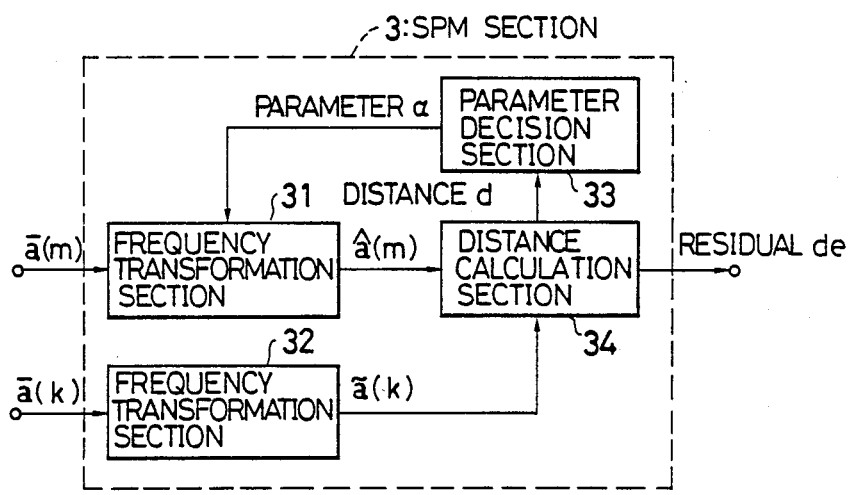
FIG. 2 is a diagram of the internal structure of the SPM section of the embodiment in FIG. 1.

The internal structure of the SPM section 3 is shown in FIG. 2. The SPM section 3 comprises two frequency transformation sections 31 and 32, a distance calculation section 34, and a parameter decision section 33. The frequency transformation section 31 for the input signal receives the linear predictive coefficients $a_{(m)}$ and generates output of a set of linear predictive coefficients $\hat{a}_{(m)}$ resulting from frequency transformation according to a variable all pass filter parameter α received from the parameter decision section 33. The frequency transformation section 31 in FIG. 2 receives the all-pass filter parameter α from the parameter calculation section 33, continuously controls the frequency, and outputs $\hat{a}(m) = \{\hat{a}_0(m), \hat{a}_1(m), \ldots, \hat{a}_q(m)\}$. The parameters α determine the amount of frequency variation. The frequency transformation section 32 for the reference speech signal receives the reference speech linear predictive coefficients $\bar{a} = \{\bar{a}_0, \bar{a}_1, \ldots, \bar{a}_p\}$, performs a frequency transformation by the same process as in the frequency transformation section 1, and outputs the reference linear predictive coefficients $\tilde{a} = \{\tilde{a}_0, \tilde{a}_1, \ldots, \tilde{a}_q\}$. The frequency transformation section 32 performs only a standard frequency transformation. The parameter $\alpha_0$ used for the transformation is fixed. In this embodiment, the standard transformation is a transformation to a phychological scale (mel frequencies).

Figure 3A:
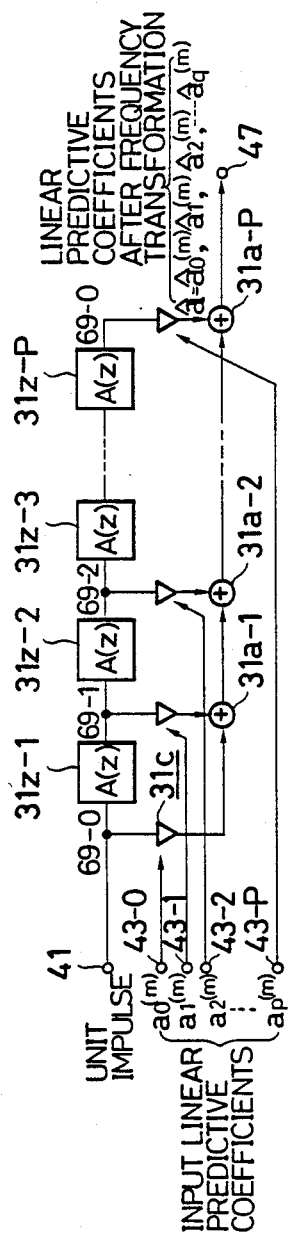
FIG. 3A and FIG. 3B show the internal structure of the frequency transformation sections in FIG. 2.

FIG. 3A shows the structure of the frequency transformation section 31 of the input speech signal. The frequency transformation section 31 comprises all-pass filters 31z, multipliers 31c, and adders 31a. The frequency transformation section 31 is identical to an FIR filter except that delay elements in an FIR filter have been replaced by the all-pass filters 31z. The frequency transformation section receives linear predictive coefficients as tap coefficients. The impulse response of the all-pass filters 31z is the set of linear predictive coefficients $\hat{a}_{(m)} = \{\hat{a}_0^{(m)}, \hat{a}_1^{(m)}, \ldots, \hat{a}_p^{(m)}\}$ after frequency transformation. The frequency transformation section 32 of the reference speech signal is similar.

The general form of the transfer function of an all-pass filter is:

$$A(z) = \pm \prod_{i=1}^{N} (z^{-1} - \alpha_i)/(1 - \alpha_i z^{-1}) \quad (1)$$

Figure 3B:
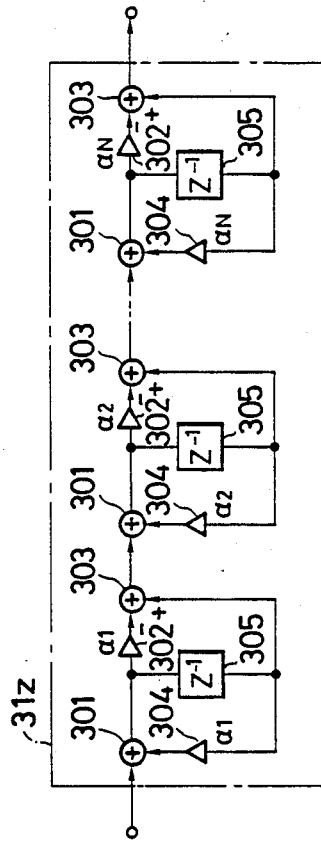

FIG. 3B shows an example of the structure of an all-pass filter. The order of the filter shown is N, with each section comprising adders 301 and 303, multipliers 304 and 302 for the parameter α, and a delay element 305. In this embodiment the all-pass filters in each stage have the same order. If a first-order all-pass filter is used, the relation between $a_{(m)}$ and $\hat{a}_{(m)}$ is:

$$\hat{a}_i^{(m)} = \frac{1}{2\pi j} \oint z^{i-1} \sum_{j=0}^{P} a_j^{(m)} \{(z^{-1} - \alpha)/(1 - \alpha z^{-1})\}^j dz \quad (2)$$

The frequency θ in the $a_{(m)}$ is transformed in â to:

$$\omega = \tan^{-1}\{(1-\alpha^2)\sin\theta/2 + (1+\alpha^2)\cos\theta\} \quad (3)$$

Figure 3C:
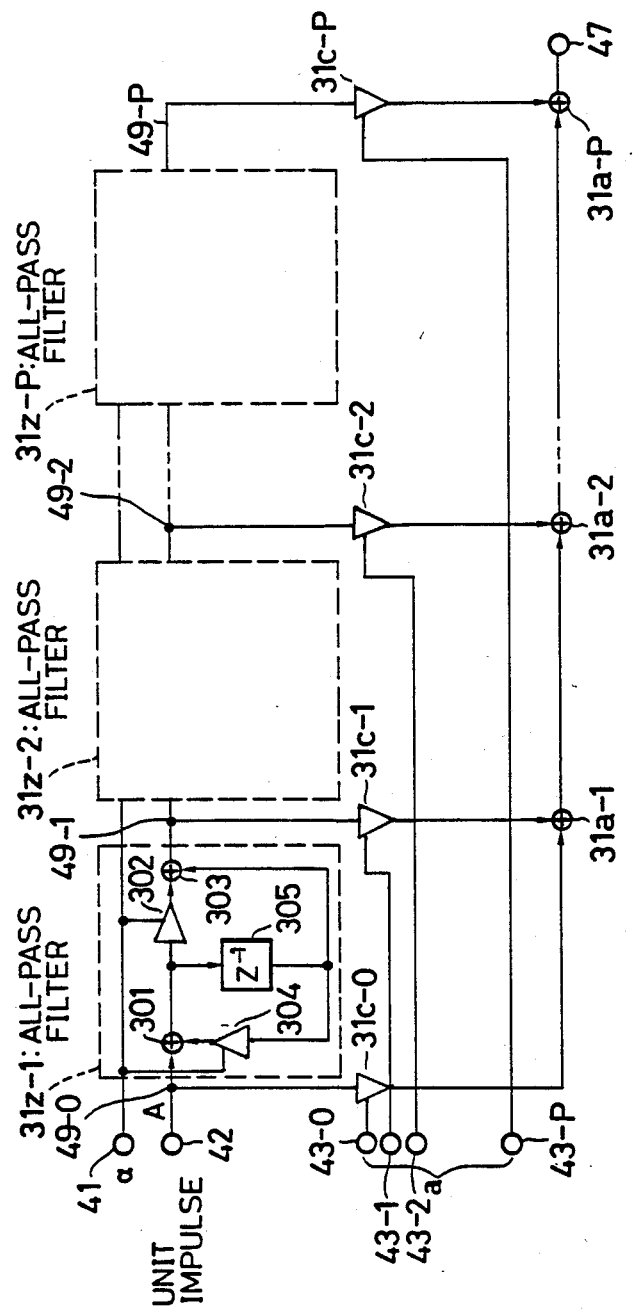
FIG. 3C is a diagram combining FIG. 3A and FIG. 3B to show the frequency transformation sections.

FIG. 3C is a diagram combining FIG. 3A and FIG. 3B to show the frequency transformation section 31.

The principle of operation of the frequency transformation section will be explained with reference to FIG. 3C.

The numeral 41 denotes an input terminal for the parameter α determining the amount of frequency transformation, numeral 42 denotes is an input terminal for a digital unit impulse series {1, 0, ..., 0}, numerals 43-0 to 43-P denote input terminals for the linear predictive coefficients of the input signal, numerals 44-0 to 44-P denote multipliers, numerals 31z-1 to 31z-P denote all-pass filters, numerals 31a-1 to 31a-P denote adders, and numeral 47 denotes an output terminal.

The all-pass filters 31z-1 to 31z-P comprise an adder 301, a delay element 305 a multiplier 302 a multiplier 304 and an adder 303.

The frequency transformation circuit with this configuration operates as follows. First a constant value α is received through the input terminal 41 and a unit impulse series (1, 0, ..., 0) of P+1 samples is received through the input terminal 42. At point 49-0, accordingly, the input is a unit impulse series, while at points 49-1 to 49-P the input is a series of constant values comprising the constant value α and a unit impulse series. The multipliers 31c-0 to 31c-P and the adders 31a-1 to 31a-P perform a multiply-add operation on the constant values at the points 49-0 to 49-P and the input signals received through the terminals 43-0 to 43-P to obtain the sum of the products of the constant values at the points 49-0 to 49-P and the input signals received at the input terminals 43-0 to 43-P and this sum becomes the output at the output terminal 47. The output is a time series representing the frequency transformed signal.

After frequency transformation, the distance calculation section 34 in FIG. 2 calculates the distance (difference) d between the two sets of the linear predictive coefficients $\hat{a}_{(m)}$ and $\bar{a}_{(k)}$ by the following formula:

$$\begin{aligned} d &= \hat{a}_{(m)} - \bar{a}_{(k)} \\ &= \{\hat{a}_0^{(m)} - \bar{a}_0^{(k)}, \hat{a}_1^{(m)} - \bar{a}_1^{(k)}, \ldots, \hat{a}_q^{(m)} - \bar{a}_q^{(k)}\} \\ &= \{d_0, d_1, \ldots, d_q\} \end{aligned} \quad (4)$$

The distance d obtained as the result is sent to the parameter decision section 33.

The parameter decision section 33 continuously updates the parameter α using the nonlinear-parameter least-squares method to minimize the distance d. When the circuit shown in FIG. 3B is used as the all-pass filter, then if $\alpha_{(n)}$ is the all-pass filter parameter α after the n-th update and $d_{(n)} = \{d_{0(n)}, d_{1(n)}, \ldots, d_{q(n)}\}$ is the distance d after the n-th update, then the parameter $\alpha_{(n+1)}$ after the next update is given by:

$$\alpha(n + 1) = \alpha(n) - \delta\alpha(n)$$

$$\delta\alpha(n) = \sum_{i=0}^{q} d_i(n) \cdot g_i(n) / \sum_{i=0}^{q} \{g_i(n)\}^2 \quad (5)$$

Figure 4:
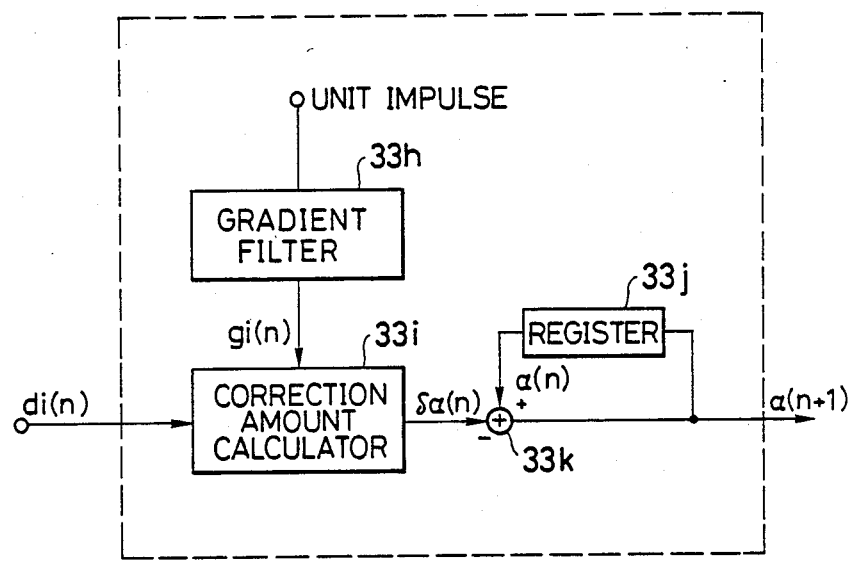
FIG. 4 is a block diagram showing an example of the parameter decision section 33 of FIG. 2.

The parameter decision section 33 receives the distance $$d(n) = \{d_0(n), d_1(n), \ldots, d_i(n), \ldots, d_q(n)\}$$

and outputs the parameter α(n+1) after the update. An example of the parameter determining section 33 is shown in FIG. 4. As illustrated, the correction amount δα(n) is calculated at a correction amount calculator 33i, from the output gi(n) of a gradient filter 33h and di(n). The parameter α(n+1) after the update is determined at an adder 33k, from the present parameter α(n) stored in a register 33j and the correction amount δα(n) from the correction amount calculator 33i.

The gradient filter 33h determines the variation gi(n) of âi(m) with respect to α(n).

Figure 5A:
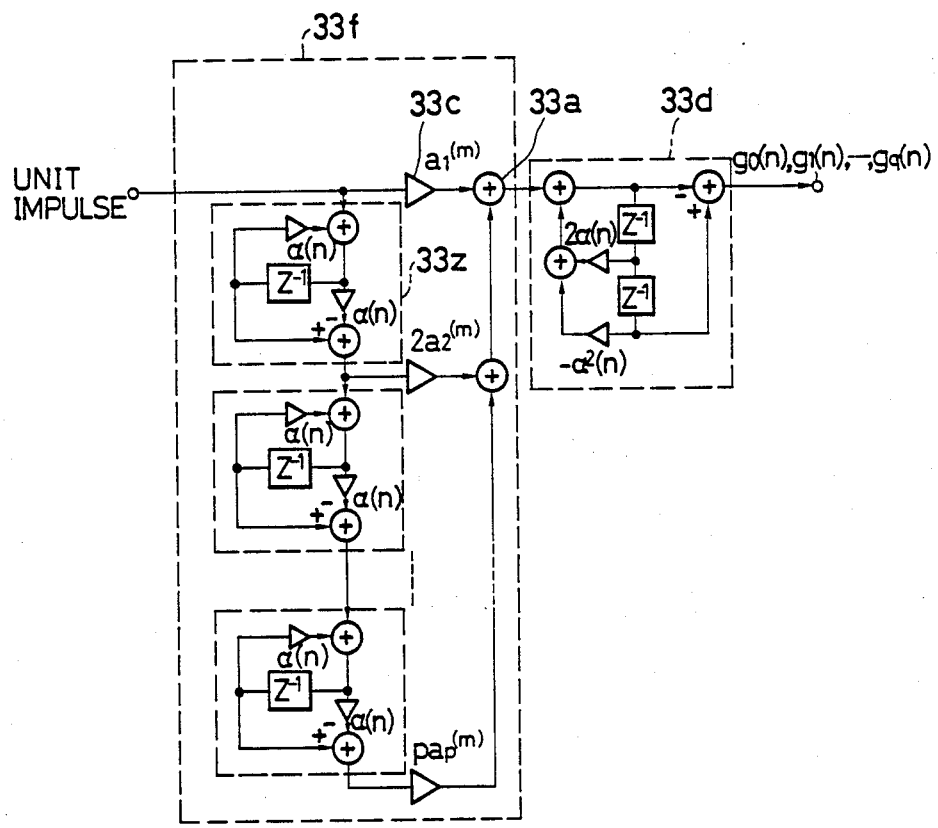
FIG. 5A is a schematic diagram of the internal structure of a filter for finding the variation $g_{i(n)}$.
Figure 5B:
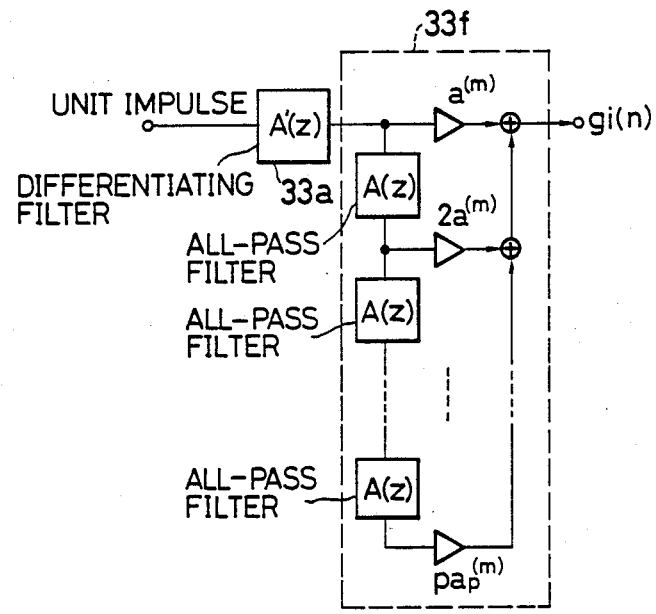
FIG. 5B is a schematic diagram of a modification of the filter of FIG. 5A.

An example of a filter for determining variations $g_{i(n)}$ of $a_i$ with respect to α(n) is shown in FIG. 5A. This filter comprises all-pass filters (A(z)) 33z (substituting delay elements in an FIR filter), multipliers 33c, adders 33a, and a differentiating filter (A'(z)) 33d. The variations $g_{i(n)}$ are obtained as a time series from the impulse response of the filters shown. In FIG. 5A the differentiating filter 33d is located on the output side, but it could also be located on the unit impulse input side as shown in FIG. 5B. That is, the differentiating filter 33d is placed in a prestage before the FIR filter 33f configured similarly to the frequency transformation circuit. The output of this differentiating filter 33d is a constant value corresponding to the input unit impulse and the input parameter α, and the variation g can be obtained by a simple multiply-add calculation using a ROM circuit. More specifically, the variations $g_{i(n)}$ are given by a time series according to the impulse response of the filter:

$$g_i(n) = \frac{1}{2\pi j} \phi z^{i-1} \sum_{i=1}^{P} a_j^{(m)} j \quad (6)$$

$$\{(z^{-1} - \alpha_{(n)})/(1 - \alpha_{(n)}z^{-1})\}^{j-1}$$

$$(z^{-2} - 1)/(1 - \alpha_{(n)}z^{-1})^2 dz$$

The initial value of α is set equal to the fixed parameter $\alpha_0$ of the frequency transformation section 32 for the reference speech signal.

When the difference between the parameter $\alpha_{(n)}$ and the updated parameter $\alpha_{(n+1)}$ is such that $|\{\alpha_{(n+1)} - \alpha(n)\}/\alpha_{(n)}| < \epsilon$ (where $\epsilon$ is a threshold value), the distance calculation section 34 generates the output de according to the following formula:

$$de = \sum_{i=0}^{q} (d_{i(n+1)})^2 \quad (7)$$

This de is the residual left after adaptive frequency control to minimize the distance of the input linear predictive coefficients a. That is, $d_e$ is the residual resulting from pattern matching of the input signal and reference signal on the frequency axis.

Let de(m, k) be the residual resulting from pattern matching on the frequency axis performed by the SPM section 3 on the linear predictive coefficients $a_{(m)}$ of the input speech signal and the linear predictive coefficients $\bar{a}_{(k)}$ of the reference speech signal.

Figure 6:
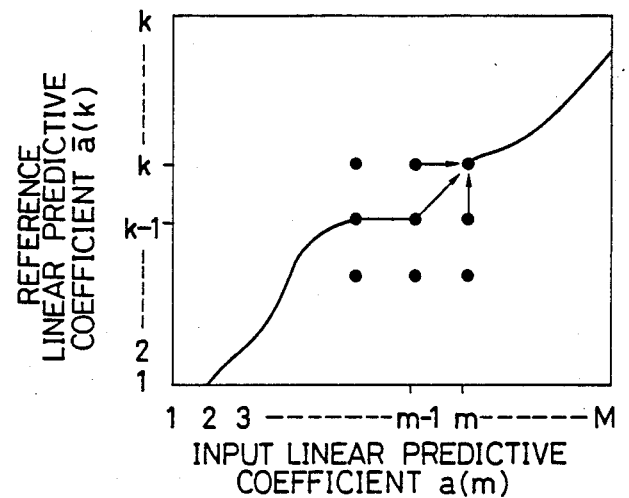
FIG. 6 explains the pattern matching process performed in the DPM section.

FIG. 6 shows how the DPM section 4 performs pattern matching on the time axis on the basis of this residual de(m, k). The values of de(m, k) are located at the grid points in FIG. 6. The DPM section 4 determines the path from the point (1, 1) to the point (M, K) that minimizes the sum of the de(m, k):

$$\sum_{(m,k)=0,0}^{(M+1),(k+1)} de(m, k).$$

This sum is determined by a recursive formula, the partial sum D(m, k) being given by:

$$D(m, k) = \min \begin{cases} D(m, k - 1) + de(m, k) \\ D(m - 1, k - 1) + 2de(m, k) \\ D(m - 1, k) + de(m, k) \end{cases} \quad (8)$$

where D(0, 0)=0, D(m, 0)=∞(m≠0), D(0, k)=∞(k≠0), de(M+1, K+1)=0. The final pattern matching residual De is:

$$De = D(M+1, K+1)/(M+K) \quad (9)$$

The DPM section 4 generates this residual De as its output.

The pattern matching method of the DPM section 4 described above does not impose any restrictions on the path, but it is also possible to determine D(m, k) as:

$$D(m, k) = \min \begin{cases} D(m - 1, k - 2) + 3de(m, k) \\ D(m - 1, k - 1) + 2de(m, k) \\ D(m - 2, k - 1) + 3de(m, k) \end{cases} \quad (10)$$

where D(0, 0)=0, D(m, k)=∞ when m ≦0 and k≠0, D(m, k)=∞ when m≠0 and k≦0, and de(M+1, K+1)=0, and obtain the pattern matching residual $$De = D(M+1, K+1)/(M+K).$$

The embodiment described above uses a method of controlling the parameter α of the SPM section 3 in which all the initial values are $\alpha = \alpha_0$ (constant), but it is possible to hasten the convergence of the parameter α by using as the initial value the converged value of the previous stage.

Figure 7:
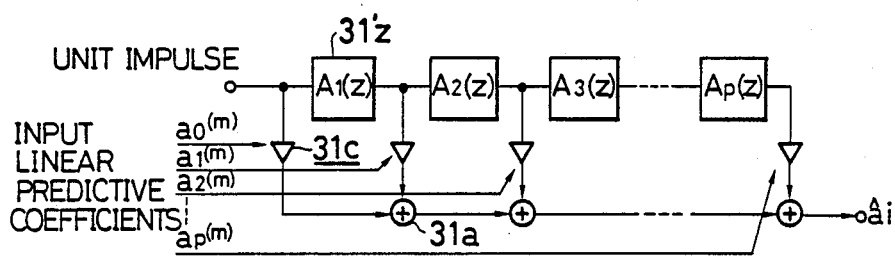
FIG. 7 is a schematic diagram showing another example of the structure of the frequency transformation sections.

For simplicity, in the frequency transformation section 31 and 32 of the SPM, the all-pass filters A(z) (31z) in all stages had the same parameter α, but it is also possible to use an all-pass filter (31'z) having a differing configuration (parameter value or order) in each stage. FIG. 7 shows an example of such a configuration.

Similarly, it should be clear that different conditions can be used as the DPM path restriction conditions.

In addition, although linear predictive coefficients were used as features in the foregoing description, linear predictive cepstral coefficients, linear predictive melcepstral coefficients, or other coefficients obtained by the linear predictive method could be used instead. The term "linear predictive analysis coefficient(s)" as used in the appended claims should therefore be construed to cover such alternatives.

Futhermore, in the preceding embodiment the parameter $\alpha$ of the frequency transformation section 31 of the input speech signal (input pattern), which is the delay (frequency transformation amount), was adaptively controlled, but it is also possible to adaptively control the delay of the frequency transformation section 32 of the reference pattern, or to control the delays of both frequency transformation sections adaptively, although that would require an increased amount of computation.

In the above configurations, pattern matching functions are provided for both the frequency axis and the time axis and pattern matching is performed simultaneously on these two axes using linear predictive analysis coefficients, so the matching process is accurate and simple. As a pattern matching method for use in speaker-independent speech recognition apparatus, this method can be expected to improve the recognition rate.

Figure 8:
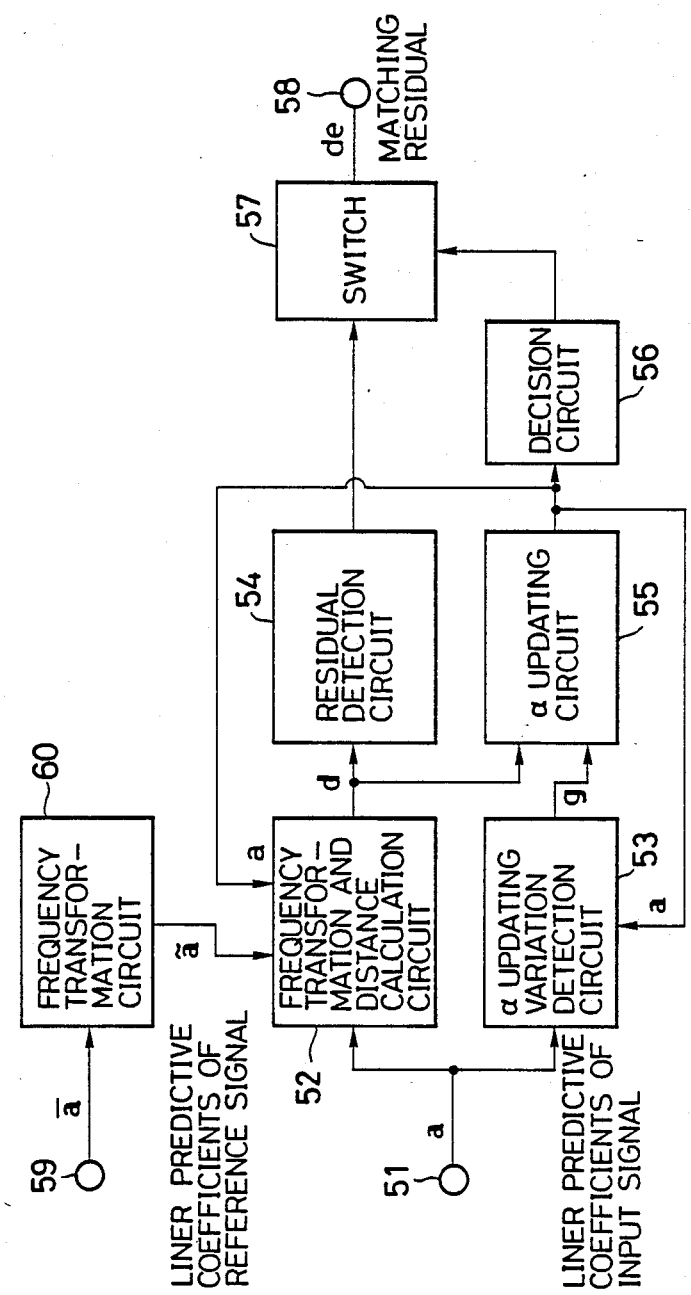
FIG. 8 is a block diagram explaining the principle of operation of another embodiment of this invention.
Figure 9:
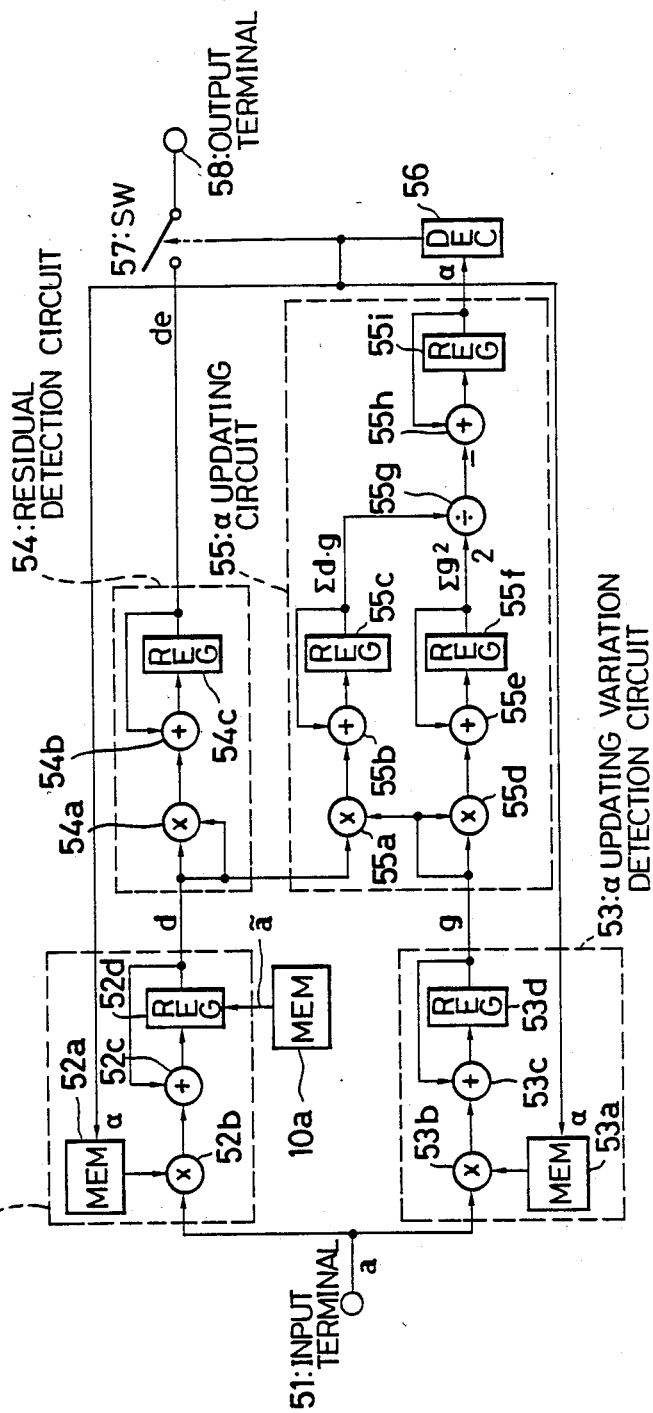
FIG. 9 is a schematic diagram of this embodiment.

FIG. 8 and FIG. 9 show another embodiment of this invention. FIG. 8 is a block diagram explaining the principle of operation of this embodiment. FIG. 9 is a schematic diagram of a pattern matching circuit illustrating an embodiment of this invention.

First the principle of operation of this embodiment will be explained with reference to FIG. 8. In FIG. 8 reference numeral 51 denotes an input terminal for the linear predictive coefficients of an input signal (input pattern), numeral 52 denotes a frequency transformation and distance calculation circuit, numeral 53 denotes an $\alpha$ updating variation detection circuit, 54 is a residual detection circuit, numeral 55 denotes an updating circuit, numeral 56 denotes a decision circuit (DEC), numeral 57 denotes a switch (SW), numeral 58 denotes an output terminal, numeral 59 denotes an input terminal for input of linear predictive coefficients of a reference pattern (standard pattern), and numeral 60 denotes a frequency transformation circuit. The time series $a = \{a_0, a_1, \ldots, a_p\}$ of the linear predictive coefficients of the input signal through the input terminal 51 are input as tap coefficients to and frequency-transformed by the frequency transformation circuit which may be similar to that shown in FIG. 3A through FIG. 3C, which acts on a unit impulse series. The frequency transformation circuit is similar to an FIR filter, but its delay elements have been replaced by all-pass filters. Thus, the frequency transformation circuit of the frequency transformation and distance calculation circuit 52 performs a frequency transformation corresponding to a parameter $\alpha$ that defines the all-pass filters of an FIR filter to produce an output impulse series $\hat{a}$.

The time series $\bar{a} = \{\bar{a}_0, \bar{a}_1, \ldots, \bar{a}_p\}$ of linear predictive coefficients of the reference signal is subjected only to a standard frequency transformation in the frequency transformation circuit, obtaining $\tilde{a} = \{\tilde{a}_0, \tilde{a}_1, \ldots, \tilde{a}_q\}$. In this case the parameter defining the all-pass filters has the fixed value $\alpha_0$.

Next, the distance calculation circuit in the frequency transformation and distance calculation circuit 52 generates the distance d between the frequency-transformed linear predictive coefficients $\hat{a}$ and $\tilde{a}$, where $d = \hat{a} - \tilde{a} = \{d_0, d_1, \ldots, d_q\} = \{\hat{a}_0 - \tilde{a}_0, \hat{a}_1 - \tilde{a}_1, \ldots, \hat{a}_q - \tilde{a}_q\}$.

At this time, an impulse response g expressing the variation in $\hat{a}$ when the parameter $\alpha$ is moved is obtained from the $\alpha$ updating variation detection circuit 53, which comprises an FIR filter similar to the frequency transformation circuit.

The parameter $\alpha$ is continuously updated so as to minimize the distance d. If $\alpha(n)$ is the parameter $\alpha$ after the n-th update and $d(n) = \{d_0^{(n)}, d_1^{(n)}, \ldots, d_q^{(n)}\}$ is the distance d after the n-th update, then the parameter $\alpha(n+1)$ after the next update is given by:

$$\alpha(n+1) = \alpha(n) - \sum_{i=0}^{q} d_i(n) \cdot g_i(n) / \sum_{i=0}^{q} \{g_i(n)\}^2$$

This calculation is performed by the $\alpha$ updating circuit 55. The initial value of $\alpha$ is the value $\alpha_0$ used in the frequency transformation of the linear predictive coefficients $\bar{a}$ of the reference signal.

When the decision circuit 56 obtains from the parameter $\alpha(n)$ and the updated parameter $\alpha(n+1)$ the result $|\{\alpha(n+1) - \alpha(n)\}/\alpha(n)| < \epsilon$ (where $\epsilon$ is a threshold value), the residual detection circuit 54 outputs the result of the following calculation through the switch 57:

$$d_e = \sum_{i=0}^{q} \{d_{i(n+1)}\}^2$$

This $d_e$ is the residual left when frequency control is adaptively performed to minimize the distance between the linear predictive coefficients a of the input signal and the reference linear predictive coefficients $\bar{a}$; that is, it is the residual left after pattern matching on the frequency axis. The frequency transformation circuit in the frequency transformation and distance calculation circuit 52 can be the one identical to that shown in FIG. 3A to FIG. 3C.

An explanation will now be given of the operation of the circuit in FIG. 9, which embodies the principles of operation just described for pattern matching on the frequency axis. Component elements in FIG. 9 that are identical to elements in FIG. 8 are indicated by the same reference numerals. The memory (MEM) 60a holds precalculated values of the linear predictive coefficients $\tilde{a}$ obtained by frequency transformation of the linear predictive coefficients $\bar{a}$ of the reference signal and provides output of $-\tilde{a}$ in order to calculate a distance. The frequency transformation and distance calculation circuit 52 comprises a parameter memory (MEM) 52a, a multiplier (MPY) 52b, an adder (ADD) 52c, and a register (REG) 52d. The $\alpha$ updating variation detection circuit 53 comprises a parameter memory (MEM) 53a, a multiplier (MPY) 53b, an adder (ADD) 53c, and a register (REG) 53d.

The residual detection circuit 54 comprises a multiplier (MPY) 54a, an adder (ADD) 54b, and a register (REG) 54c. The $\alpha$ updating circuit 55 comprises multipliers (MPY) 55a and 55d, adders (ADD) 55b, 55e, and 55h, registers (REG) 55c, 55f, and 55i, and a divider (DIV) 55g.

The operation of this embodiment is described next.

First the time series a of linear predictive coefficients of the input signal is input from the input terminal 55 to the frequency transformation and distance calculation circuit 52. The circuit 52 uses the multiplier 52b, the adder 52c, and the register 52d to multiply and add the input linear predictive coefficients with the series of constant values output from the memory 52a (which consist of the parameter α and an impulse series as described earlier). If the frequency-transformed reference data −a stored in the memory 60a are placed in the register 52d as initial values, the result of the multiply-add calculation described above is the distance d.

At the same time, the linear predictive coefficients are input by the α updating variation detection circuit 53. This circuit 53 uses the multiplier 53b, the adder 53c, and the register 53d to multiply and add the series of constant values output from the memory 53a and the input linear predictive coefficient series, yielding as output the variations g. The initial value of the register 53d in this operation is "0."

Next, the residual detection circuit 54 uses the multiplier 54a to square the distance time series d received from the α updating variation detection circuit 53, and uses the adder 54b and register 54c (which is initialized to "0") to add the results and obtain the residual $d_e$. The true matching residual is not obtained, however, unless the values of α converge. The control for this purpose will be described later.

Next the α updating circuit 55 uses the multiplier 55a, the adder 55b, and the register 55c to multiply and add the distance time series d with the output g of the α updating variation detection circuit 53 to obtain Σd·g. At the same time, the multiplier 55d squares the output of the updating variation detection circuit 53, and the adder 55e and register 55f obtain the sum Σg². Next the divider 55g performs the division Σd·g/Σg², and the adder 55h adds the previous value of α in the register 55i (at the start time this is the initial value) to obtain a new value of α.

The decision circuit 52c decides whether the value of α obtained in this way has converged or not. If it decides that the value has not converged, the updated value of α is used to change the values in the memory 52a and the memory 53d. If the range of is limited, the memory 52a and the memory 53d can be implemented as ROM circuits containing, in each memory, a calculated value for each value of α that can be selected.

The above-described operation is repeated until the value of α converges. When the decision circuit 56 decides that the value has converged, it closes the output control switch 57, and the output $d_e$ of the residual detection circuit 54 calculated with the value of α determined at this time becomes the output at the output terminal 58 representing the pattern matching residual on the frequency axis.

In the above configuration, a first and a second series of constant values corresponding to parameter values determining frequency transformation quantities are held in memory means, multiply-add operations are performed on these series of constant values and linear predictive coefficients representing features to calculate frequency-transformed linear predictive coefficients, distances, and variations, and parameter matching on the frequency axis is performed with adaptive control of the parameters, so the circuit can be compact and simple in configuration, and precise pattern matching on the frequency axis can be performed. It is thus possible to provide inexpensive speech recognition equipment with an improved rate of recognition.

Figure 10:
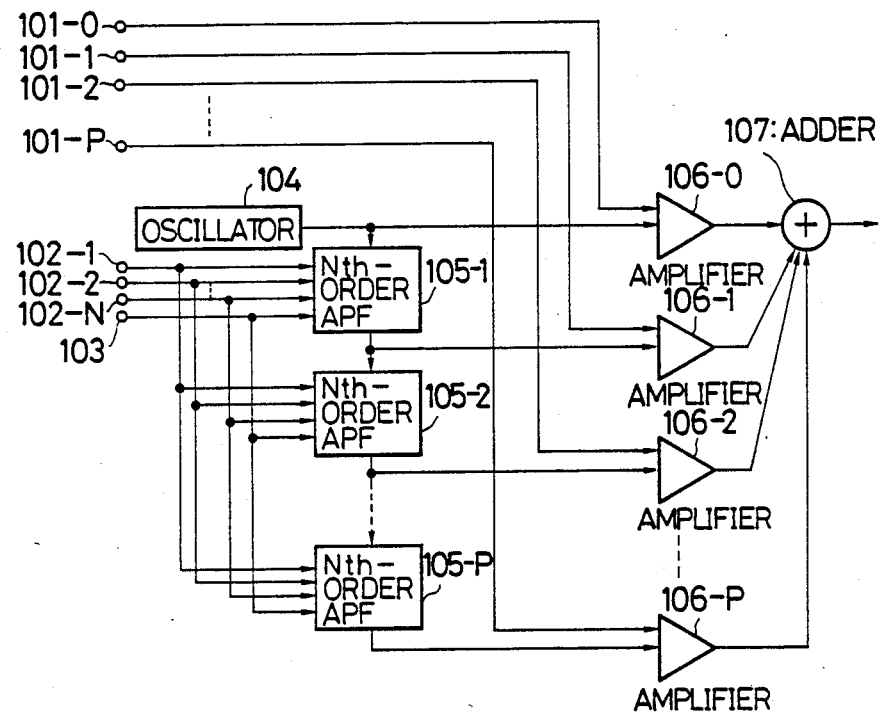
FIG. 10 is a block diagram showing a modification of the frequency transformation circuit.

A modification of the frequency transformation circuit incorporated in the above-described pattern matching system is shown in FIG. 10.

In FIG. 10 the numerals 101-0, 101-1, ..., 101-P, 102-1, 102-2, ..., 102-N, and 103 denote terminals, 104 is an oscillator, 105-1, 105-2, ..., 105-P are Nth-order all-pass filters (APFs), 106-0, 106-1, 106-2, ..., 106-P are amplifiers, and 107 is an adder. The Nth-order APFs 105-1, 105-2, ..., 105-P all have the same transfer function:

$$A \prod_{k=1}^{N} \frac{Z^{-1} - \alpha_k}{1 - \alpha_k Z^{-1}} = A \cdot \frac{Z^{-1} - \alpha_1}{1 - \alpha_1 Z^{-1}} \cdot \frac{Z^{-1} - \alpha_2}{1 - \alpha_2 Z^{-1}} \cdots \frac{Z^{-1} - \alpha_N}{1 - \alpha_N Z^{-1}}$$

where the $\alpha_k$ are constants such that $|\alpha_k| < 1$ (k=1, ..., N) and A is the constant 1 or −1. Values in the range from −1 to 1, corresponding to the desired frequency transformation characteristic, are input at the terminals 102-1, ..., 102-N, and the value 1 or −1 is input at the terminal 103. The values from the terminals 102-1, ..., 102-N are furnished to all the Nth-order APFs 105-1, 105-2, ..., 105-P to set the values $\alpha_1, \alpha_2, \ldots, \alpha_N$ of the transfer function of the APFs 105-1, 105-2, ..., 105-P. The input value at the terminal 103 is also furnished to all the Nth-order APFs 105-1, 105-2, ..., 105-P to set the value A in the transfer function of the Nth-order APFs 105-1, 105-2, ..., 105-P. The terminals 101-0, 101-1, 101-2, ..., 101-P receive the first sample data, the second sample data, the third sample data, ..., the (P+1)-th sample data of the digital signal to be frequency-transformed. The data from the terminals 101-0, 101-1, 101-2, ..., 101-P are supplied to the amplifiers 106-0, 106-1, 106-2, ..., 106-P to set the gain of the amplifiers 106-0, 106-1, 106-2, ..., 106-P. Next an output signal from the oscillator 104, which generates a digital unit impulse signal, is applied to the amplifier 106-0 and the Nth-order APF 105-1. P−1 Nth-order APFs, namely the Nth-order APFs 105-2, 105-3, ..., 105-P, are connected in series to the output of the Nth-order APF 105-1. The outputs from the Nth-order APFs also become the inputs to the amplifiers 106-1, 106-2, ..., 106-P. Accordingly, the amplifier 106-0 amplifies the output signal from the oscillator 104 with a gain set by the data from the terminal 101-0. The amplifiers 106-1, 106-2, ..., 106-P amplify the output signals from the Nth-order APFs 105-1, 105-2, ..., 105-P with gains set by the data from the terminals 101-1, 101-2, ..., 101-P. The output signals from the amplifiers 106-0, 106-1, 106-2, ..., 106-P are received by the adder 107, which adds all the output signals from the amplifiers 106-0, 106-1, 106-2, ..., 106-P. The output from the adder 107 is a signal with a transformed frequency structure, derived from a digital signal having as its first sample, second sample, third sample, ..., (P+1)-th sample the data from the terminals 101-0, 101-1, 101-2, ..., 101-P by a frequency structure transformation with a characteristic defined by values of $\alpha_1, \alpha_2, \ldots, \alpha_N$ and A in the formula for the transfer function of the APFs 105-1, 105-2, ..., 105-P set by the values at the terminals 102-1, 102-2, ..., 102-N, 103.

Figure 11A:
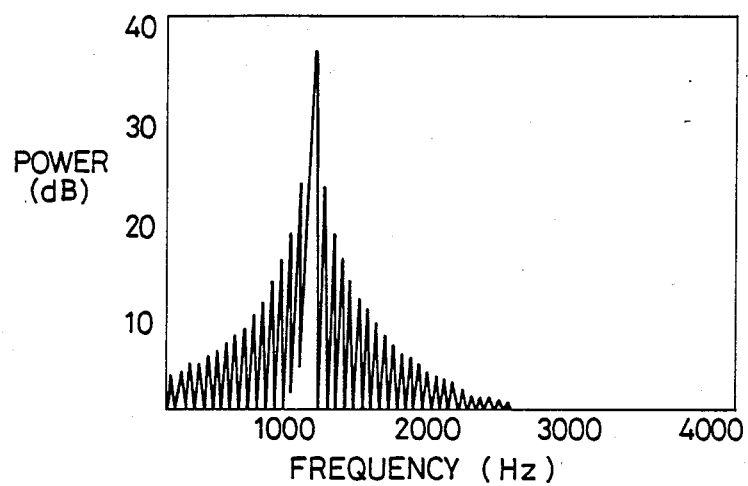
FIG. 11A and FIG. 11B are characteristic curves showing experimental data the frequency transformation circuit of FIG. 10.
Figure 11B:
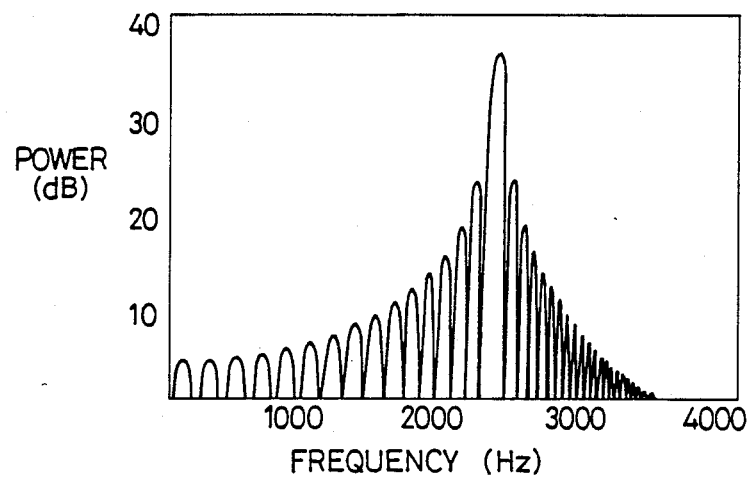

FIG. 11A and FIG. 11B are characteristic curves showing experimental data obtained with the circuit of the above configuration. In both diagrams frequency (Hz) is shown on the horizontal axis and power (dB) on the vertical axis. First-order APFs with the transfer function $A(Z^{-1}-\alpha)/(1-\alpha Z^{-1})$ were employed as the Nth-order APFs. The input signal consisted of 129 samples of a 1001 Hz sine wave sampled at a rate of 8 kHz. As the parameters A and $\alpha$ that determined the frequency structure transformation characteristic, a value of 1 was used for A and a value of $-0.5$ for $\alpha$. As can be seen by examining the transformation from FIG. 11A, which shows the power spectrum of the untransformed signal, to FIG. 11B, which shows the power spectrum of the transformed signal, it is possible to transform the frequency characteristic without changing the power.

In this embodiment, once the values from the terminals 102-1, 102-2, ..., 102-N, 103 are set they remain fixed during circuit operation, but it would be useful for a plurality of adaptive purposes to vary these values over time. Also, although the transfer functions of all the Nth-order APFs 105-1, 105-2, ..., 105-P were identical, it would be useful for a plurality of adaptive purposes to vary the transfer functions of the Nth-order APFs 105-1, 105-2, ..., 105-P with respect to each other.

As explained above, in the above configuration, there are many parameters for determining the frequency structure transformation characteristic, so a variety of frequency structure transformations can be effected. If provided with speech signal input, the circuit of the above configuration can also be used in speech signal processing apparatus. If provided with the impulse response of a filter as input, this circuit can further be used in a filter characteristic transformer, and if provided with speech recognition features as input it can be used in a speech feature transformer.

Figure 12:
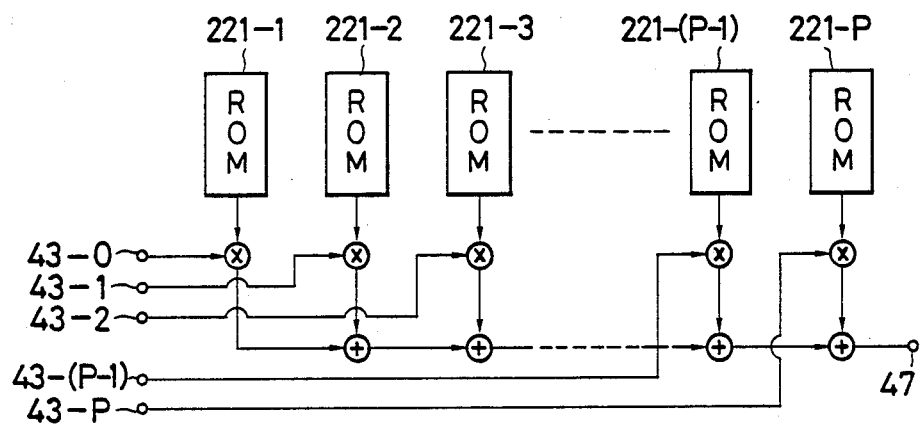
FIG. 12 is a block diagram for explaining the principle of operation of another embodiment of the frequency transformation circuit.
Figure 13:
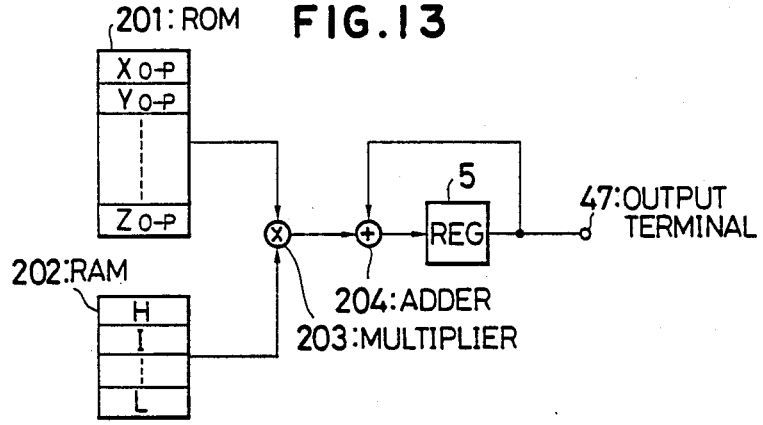
FIG. 13 is a block diagram showing the embodiment of FIG. 12.

Another modification of the frequency transformation circuit is shown in FIG. 12 and FIG. 13.

It is seen from FIG. 3C, that the values at the points 49-0, 49-1, 49-2, ..., 49-P are constants. It follows that the all-pass circuits 31z-1, 31z-2, ..., 31z-P in FIG. 3C can be configured as in FIG. 12 using ROMs 221-1, ..., 221-P wherein the constant values are stored. In other words, the time-series output of the frequency-transformed signal can be obtained from the output terminal 223 in FIG. 12 by means of a multiply-add operation performed on constant values from the ROMs 221-1, ..., 221-P and the input signals received from the terminals 222-0, 222-1, ..., 222-P.

It follows that the circuit of this embodiment can be configured as shown in FIG. 13. In FIG. 13 the numeral 201 denotes a ROM, 202 is a RAM, numeral 203 denotes a parallel multiplier, numeral 204 an adder, numeral 205 denotes a register (REG), and numeral 47 denotes an output terminal. The ROM 201 corresponds to the ROMs 21-1, ..., 21-P in FIG. 12. Locations $X_{0-P}$ in the ROM 201 contain a sequence of values corresponding to the constant values at the points 49-0, 49-1, 49-2, ..., 49-P in FIG. 3C when the unit impulse series value is 1. Locations $Y_{0-P}$ in the ROM 201 contain a sequence of values corresponding to the constant values at the points 49-0, 49-1, 49-2, ..., 49-P in FIG. 3C when the next unit impulse series value is 0. Locations $Z_{0-P}$ in the ROM 201 contain a sequence of values corresponding to the constant values at the points 49-0, 49-1, 49-2, ..., 49-P in FIG. 3C when the P+1-th sample of the unit impulse series value is 0. The RAM 202 contains the input signal series from the terminals 43-0, 43-1, ..., 43-P.

Next the operation of the above-described circuit will be explained with reference to FIG. 13.

First the multiplier 203 multiplies $X_0$ in the ROM 201 with H in the RAM 202. The result is added by the adder 204 to the initial 0 output from the register 205 and the sum is placed in the register 205. Next the multiplier 203 multiplies $X_1$ in the ROM 201 with I in the RAM 202. The result is added by the adder 204 to the previous result in the register 205 and the sum is placed in the register 205. This process is repeated through $X_{0-P}$ in the ROM 201 and L in the RAM 202, and a time series output No. 0 is obtained from the output terminal 47. Next the same process is performed on the $Y_{0-P}$ in the ROM 201 and H, I, ..., L in the RAM 202, obtaining the next time series output. If this process is repeated through $Z_{0-P}$ in the ROM 201 and H, I, ..., L in the RAM 202, the entire frequency-transformed output is obtained from the output terminal 47.

The above-described frequency transformation circuit can be made small in scale and simple in circuit configuration.

What is claimed is:

1. A circuit for pattern matching on the frequency axis, comprising:
   (a) a first transformation means having an input for receiving a unit impulse and having a first adaptive filter generally identical to an adaptive finite impulse response filter with its delay elements having been replaced by all-pass filters, for performing frequency transformation on an input signal, said first transformation means including means for receiving linear predictive analysis coefficients of the input speech signal as tap coefficients of the first adaptive filter, and for outputting linear predictive analysis coefficients of the frequency-transformed input signal,
   (b) a second transformation means having an input for receiving a unit impulse and having a second adaptive filter generally identical to an adaptive finite impulse response filter with its delay elements having been replaced by all-pass filters, for performing frequency transformation on a reference signal, said second transformation means including means for receiving linear predictive analysis coefficients of a reference speech signal as tap coefficient of the second adaptive filter, said second transformation means outputting linear predictive analysis coefficients of the frequency-transformed reference signal; and
   (c) a control means for calculating a distance between the respective linear predictive analysis coefficients output from the first transformation means and the second transformation means, controlling parameters of all-pass filters of at least one of the first and second transformation means so as to minimize this distance, and generating a pattern matching residual output on the frequency axis.

2. A pattern matching system according to claim 1, wherein said all-pass filters of said first transformation means are connected in series with each other, and the all-pass filter in a first stage of the series connection has the input of the first transformation means for receiving the unit impulse, and said all-pass filters of said second transformation means are connected in series with each other, and the all-pass filter in a first stage of the series connection has the input of the second transformation means for receiving the unit impulse.

3. A frequency transformation circuit comprising:
   a plurality of all-pass filters with designated transfer functions; said all-pass filters being connected in series with each other, a first one of the all-pass filters having means for receiving a unit impulse;
   multiplying means for multiplying an output signal from each all-pass filter by a corresponding tap coefficient, said tap coefficients being set in accordance with linear predictive analysis coefficients of an input signal to be frequency transformed; and
   an adder for adding together signals obtained from said multiplying means to produce linear predictive analysis coefficients which are the results of the frequency transformation;
   wherein, the parameters defining the transfer characteristics of said all-pass filters are so selected that the frequency structure of the input signal is transformed into the frequency structure of a time series obtained as an output signal in response to the unit impulse input.

4. A frequency transformation circuit according to claim 3, wherein said parameters are set so that the transfer functions of said all-pass filters are all the same.

5. A frequency transformation circuit according to claim 3, wherein said parameters are set so that the transfer functions of said all-pass filters differ from each other.

6. A frequency transformation circuit according to claim 3, wherein said parameters are varied over time.

7. A pattern matching system on the frequency and time axes, comprising:
   (a) a memory means for storing linear predictive analysis coefficients of an input speech signal and of a reference speech signal, and providing output of the stored coefficient data at a time specified by a command signal;
   (b) a first pattern matching section for performing pattern matching on the frequency axis, having a frequency transformation means which includes:
      (b1) a first transformation means, including a first adaptive filter generally identical to an adaptive finite impulse response filter with its delay elements having been replaced by all-pass filters, and being responsive to a unit impulse, for performing frequency transformation on the input speech signal, said first transformation means having means for receiving linear predictive analysis coefficients of the input speech signal as tap coefficients of the first adaptive filter, and for outputting linear predictive analysis coefficients of the frequency-transformed input speech signal, and
      (b2) a second transformation means, including a second adaptive filter generally identical to an adaptive finite impulse response filter with its delay elements having been replaced by all-pass filters, and being responsive to a unit impulse, for performing frequency transformation on a reference speech signal, said second transformation means having means for receiving the unit impulse at a first one of the all-pass filters, and for receiving the linear predictive analysis coefficients of the reference speech signals as tap coefficients of the second adaptive filter, and for outputting linear predictive analysis coefficients of the frequency-transformed reference speech signal,
   (c) said first pattern matching section further comprising a control means for calculating a distance between the respective linear predictive analysis coefficients output from the first transformation means and the second transformation means, controlling parameters of the all-pass filters of at least one of the first and second transformation means so as to minimize this distance, and generating a pattern matching residual output on the frequency axis; and
   (d) a second pattern matching section for performing pattern matching on the time axis by dynamic programming according to the residual output from the first pattern matching section, thereby generating a pattern matching residual output on the time axis, and for giving the command signal to the memory means.

8. A pattern matching system according to claim 7, wherein said all-pass filters of said first transformation means are connected in series with each other, and the all-pass filter in a first stage of the series connection has an input for receiving the unit impulse, and said all-pass filters of said second transformation means are connected in series with each other, and the all-pass filter in a first stage of the series connection has an input for receiving the unit impulse.

* * * * *